Aug. 5, 1969         C. E. WEBBE         3,459,233
JACKETED STRIP-WOUND METAL HOSE
Filed April 12, 1967
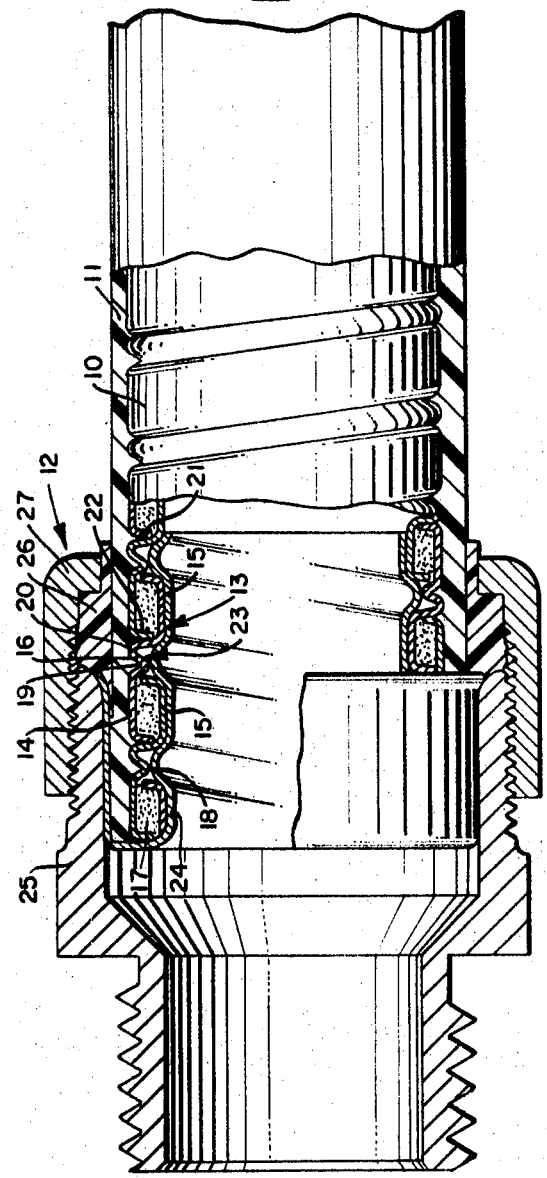
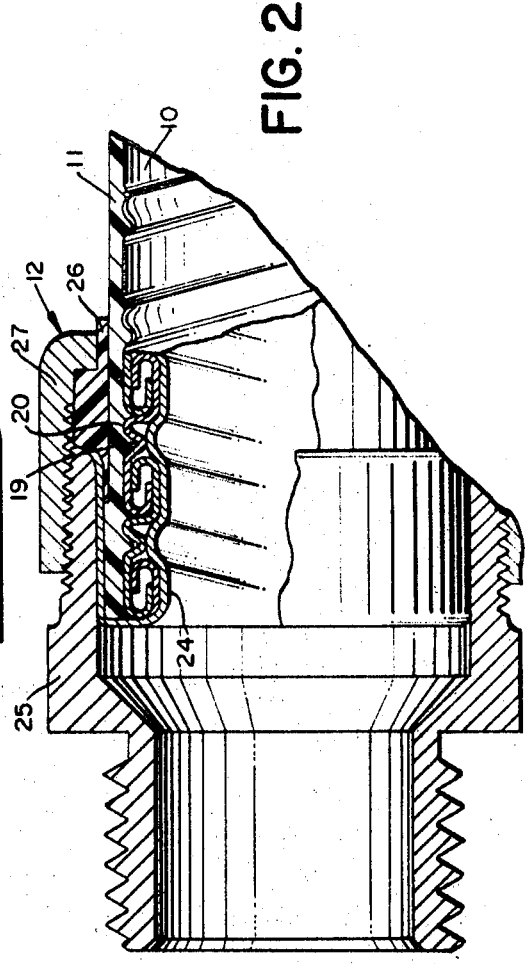
INVENTOR
CHARLES E. WEBBE
ATTORNEYS

United States Patent Office 3,459,233
Patented Aug. 5, 1969

3,459,233
JACKETED STRIP-WOUND METAL HOSE
Charles E. Webbe, Waterbury, Conn., assignor to Anaconda American Brass Company, a corporation of Connecticut
Filed Apr. 12, 1967, Ser. No. 630,284
Int. Cl. F16l *11/00, 11/14*
U.S. Cl. 138—131       3 Claims

ABSTRACT OF THE DISCLOSURE

A jacketed strip-wound metal hose with a profile characterized by having its marginal edge portions interlocked with adjacent convolutions and maintained spaced by an intermediate portion which is configured to provide a continuous helical groove on the outside wall of the hose for penetration by jacket material and a continuous helical groove in the inside wall of the hose for receiving a male threaded fitting member.

Background of the invention

This invention relates to a jacketed strip-wound metal hose having an improved profile construction.

This is an improvement over strip-wound metal hoses of the type disclosed in U.S. Patent No. 3,073,351 which describes a strip-wound metal hose having a seamless jacket of flexible plastic material applied over its outer surface to render the hose moisture tight and protect the metal from abrasion. As described in the aforesaid patent, the plastic material is extruded about the strip-wound metal hose in such manner that the soft plastic material is in snug engagement with the hose. The present invention provides an improvement in jacketed strip-wound metal hose of this type in that it includes means for mechanically locking the plastic jacket with the metal hose, and simultaneously provides an internal helical groove into which a male-threaded ferrule can be screwed at the end of the metal hose. In the hose construction of the invention, there is no wrinkling of the jacket when the hose is bent, since the plastic material is applied to the strip-wound hose while it is in its substantially fully axially compressed condition.

Summary of the invention

Broadly stated, the invention relates to jacketed strip-wound metal hose in which the strip is wound with its marginal side edges axially interlocked with the marginal side edges of adjacent convolutions. A seamless jacket of plastic material fits snugly about the outer surface of the hose. An intermediate portion of the strip is configured to define a continuous helical groove on the outside wall of the metal hose between interlocked marginal side edges. The metal fold defining such groove maintains the interlocked marginal side edges of the strip axially spaced apart even where the hose convolutions are in their substantially fully axially compressed condition. The jacket material penetrates into the outside helical groove, thus locking the jacket to the hose. The grooved intermediate portion of the strip penetrates only to a shallow depth between interlocked marginal side edges of adjoining convolutions, so as to leave open on the inside of the hose a continuous helical groove between convolutions. This helical groove serves as a female thread adapted to receive a male threaded ferrule at end portions of the hose.

The intermediate section in profile has a first U-shaped portion of an inside diameter greater than the minimum inside diameter of the metal hose, and continues to a second inverted U-shaped portion of essentially the same outside diameter as the maximum outside diameter of the metal hose. The wall of this second U-shaped portion forms a shoulder against which the adjacent convolution of the hose abuts when the hose is in the axially compressed condition.

Brief description of the drawing

FIG. 1 is a section of a first embodiment of a hose assembly of the invention showing a strip-wound metal hose in which the side edges of the strip are bent through about 90° and a packing is disposed within the interlocking convolutions; and FIG. 2 is a section of a second embodiment of a hose assembly of the invention in which the side edges of the strip are bent through about 180° and interlock directly without any packing material disposed therebetween.

Description of the preferred embodiment

Referring now to FIG. 1, the invention is comprised of a strip-wound metal hose 10 over which a plastic jacket 11 is extruded, in snug engagement therewith. Shown attached to one end portion of the jacketed strip-wound metal hose is a conventional end fitting assembly 12. The plastic jacket is usually a thermoplastic such as a vinyl chloride polymer, polyethylene, a rubber composition or the like. The improvement resides in a new profile of the strip 13 forming the strip-wound metal hose. The strip 13 is wound helically with a marginal side edge portion 14 overlapping the opposite side edge portion 15 of the adjoining convolution, as is customary in the art. The intermediate portion of the strip is configured into a corrugated portion 16.

In FIG. 1, the extreme side edges of the strip are bent through about 90°, and have a packing 17 wound in the space between the interlocking convolution. The outer portion 14 and the inner portion 15 of each convolution are in profile generally flat, and respectively define the outer and inner surfaces of the flexible metal hose. The intermediate corrugated section 16 in profiile has a first U-shaped portion 18, defining an outer helical groove 19 and extending inwardly to about one-half the total thickness of the packed convolution. A second U-shaped portion 20, inverted with respect to the first portion, is formed to essentially the same outside diameter as the outside diameter of the hose. This inverted U directly adjoins the inner portion 15, and its side wall defines a generally radial extending shoulder 21 between adjoining convolutions. The shoulder 21 is positioned for abutment by the inwardly bent side edge 22 of the adjacent overlapped strip convolution. When the hose is in its fully axially compressed condition, the bent side edge 22 of one convolution is in abutment with the shoulder 21 of the intermediate corrugated section of the strip of the adjacent convolution; but when the hose is axially extended the bent edge 22 is not in abutment with the shoulder 21. Because the first U-shaped portion 18 of the corrugated intermediate section 16 does not penetrate to more than about half the thickness of the packed convolution of the metal hose, an inner helical groove 23 is formed between adjacent interlocked convolution marginal edge portions. The minimum width of this groove is fixed by the axial length of the corrugated intermediate section, and this groove is preserved even when the hose is axially compressed to the maximum possible extent.

The outside helical groove 19 provides a continuous helical groove at the outside of the metal hose independent of the degree of axial compression of the hose, into which the plastic jacket material can be extruded to so as to interlock with the hose and so prevent any of the jacket from becoming axially displaced relative to the metal hose.

Engaging the end portion of the hose 10 is a male ferrule which is formed with an axially extending portion 24. This latter portion is formed with a male thread of proper profile and pitch to screw into the inner helical grooves 23 defined between adjacent interlocked convolutions of the metal hose when the hose is in the axially compressed condition. The male ferrule is a part of the conventional end fitting assembly 12 which includes a male fitting 25, an annular gasket 26 and a shouldered nut 27.

Referring now to FIG. 2, the end fitting assembly, the construction of the metal hose, and the jacket all are the same as described above with respect to FIG. 1, except that the profile of the strip is such that the side edge portions are bent through about 180° and interlock directly with no packing between interlocked convolutions.

I claim:

1. In a jacketed strip-wound flexible metal hose wherein the strip is wound with its marginal side edges axially interlocked with the marginal side edges of adjacent convolutions and a seamless jacket of plastic material fits snugly about the outer surface of the hose, the improvement in combination therewith comprising an intermediate portion of strip configured by a fold therein to define a continuous helical groove on the outside wall of the metal hose between interlocked marginal side edges, with the fold defining the groove maintaining the interlocked marginal side edges of the strip axially spaced apart when the hose convolutions are in their substantially fully axially compressed condition, the jacket material penetrating into the outside helical groove and locking the jacket to the hose, and the minimum inside diameter of the hose defined by the grooved intermediate portion being substantially greater than the inside diameter defined at the interlocked marginal side edges of adjoining convolutions, so as to leave open on the inside of the hose a continuous helical groove between convolutions defining a female thread adapted to receive a male threaded ferrule at end portions of the metal hose.

2. A jacket hose according to claim 1 wherein the intermediate section in profile having a first U-shaped portion of an inside diameter greater than the minimum inside diameter of the metal hose, and continuing to a second inverted U-shaped portion of essentially the same outside diameter as the maximum outside diameter of the metal hose, a wall of this section U-shaped portion forming a shoulder against which the adjacent convolutions of the hose abuts when the hose is in the axially compressed condition.

3. A jacketed metal hose assembly according to claim 1 having end fitting assembly connected thereto, including male ferrule means extending axially into an end portion of the hose and threaded into the inner helical groove defined between interlocking convolutions.

References Cited

UNITED STATES PATENTS

| 1,021,567 | 3/1912 | Berryman et al. | 138—135 |
| 1,224,431 | 5/1917 | Van Vorst | 138—135 |
| 2,832,375 | 4/1958 | Phillips | 138—135 |
| 3,311,133 | 3/1967 | Kinander | 138—136 |

MERVIN STEIN, Primary Examiner

U.S. Cl. X.R.

138—135, 136